United States Patent [19]
Horak

[11] Patent Number: 6,079,551
[45] Date of Patent: Jun. 27, 2000

[54] IDLER SUPPORT SYSTEM FOR TUBULAR CONVEYORS

[76] Inventor: Ralph M. Horak, 23 Spinnaker La. Mariner's Cove, Lake View, New Orleans, La. 70124

[21] Appl. No.: 09/379,002

[22] Filed: Aug. 23, 1999

Related U.S. Application Data

[63] Continuation of application No. 09/054,734, May 22, 1996, Pat. No. 5,941,368.

[51] Int. Cl.⁷ .................................................. B65G 15/40
[52] U.S. Cl. .......................................... 198/819; 198/828
[58] Field of Search .................................... 198/819, 823, 198/825, 828, 829, 830

[56] References Cited

U.S. PATENT DOCUMENTS

| | | | |
|---|---|---|---|
| 3,311,221 | 3/1967 | Burkitt et al. | 198/819 X |
| 4,402,394 | 9/1983 | Hashimoto | 198/819 X |
| 4,630,726 | 12/1986 | Hashimoto | 198/819 |
| 4,747,344 | 5/1988 | Hashimoto et al. | 198/819 X |
| 4,809,844 | 3/1989 | Hashimoto et al. | 198/814 |
| 5,246,102 | 9/1993 | Rappen et al. | 198/828 X |
| 5,293,988 | 3/1994 | Sumino | 198/819 X |
| 5,941,368 | 8/1999 | Horak | 198/819 |

FOREIGN PATENT DOCUMENTS

| | | | |
|---|---|---|---|
| 262317 | 10/1988 | Japan | 198/819 |
| 1569307 | 6/1990 | U.S.S.R. | 198/814 |
| 88042169 | 6/1988 | WIPO | 198/819 |

*Primary Examiner*—James R. Bidwell
*Attorney, Agent, or Firm*—Ramon L. Pizarro; Edwin H. Crabtree

[57] ABSTRACT

An idler support system for use with a tubular conveyor. The system includes an idler frame that includes a generally U-shaped frame component defined by a first leg and a second leg joined by a generally semicircular portion joining the first leg and the second leg. The semicircular portion has been adapted for accepting at least one idler roller. A closeout section extens from the first leg to the second leg of the U-shaped frame, so that the edges of the tubular conveyor are held in the overlapping arrangement position by at least one idler roller attached to the semicircular portion.

18 Claims, 6 Drawing Sheets

IDLER SUPPORT SYSTEM FOR TUBULAR CONVEYORS

REFERENCE TO RELATED APPLICATIONS

This application is a continuation of my application having Ser. No. 09/054,734, filed May 22, 1996, now U.S. Pat. No. 5,941,368.

BACKGROUND OF THE INVENTION (a) Field of the Invention

This invention generally relates to an idler support system for supporting the idlers used in tubular conveyor systems. More specifically, to a system for supporting the idlers of pipe forming and pipe keeping sections of tubular conveyors.

(b) Discussion of Known Art

Pipe or tube conveyors are relatively new in the history of the bulk handling industry. Much of the known technology was developed by Japan Pipe Conveyor Company (JPC) in the mid seventies. When first developed, the pipe conveyor's high investment cost was considered a major disadvantage. However, with today's environmentally concerned world, the conveyor' self sealing ability makes it a very environmentally friendly conveyor system. Furthermore, the flexibility of pipe conveyor systems has the ability to replace a complete system of conventional straight or curved conveyors of large radii with one single run of belt, combining straight and vertical or horizontal curved sections. The tubular conveyor's flexibility is due in large part to the system's ability to accommodate both vertical and horizontal curves of relatively small radii, a feature that eliminates the need for equal number of junction houses with their corresponding drive, take-up, and transfer chute arrangements.

In simplified form, pipe conveyors are belts which have been formed into tubular sections by a set of radially positioned rollers or idlers. Typically, the material to be conveyed is delivered to the belt at an end of the belt while the belt in unwrapped or open. Then, the belt is gradually rolled up by means of pipe forming idlers into a tubular shape with overlapping edges. By maintaining the overlap and/or seal on top of the circular cross section, the conveyor insures that the material is conveyed to the head terminal. Once the material reaches the opposite end of the conveyor, the belt is then unfolded into a flat belt configuration to navigate the conventional head, drive and take-up pulley assemblies. On its return route the empty belt is reshaped into the circular geometry, which is maintained all the way to the tail pulley terminal where the process of unfolding and pipe forming repeats itself. To ensure that the material from the conveyor does not spill, or so that the material being carried is not exposed to the environment, the belt is sufficiently overlapped at the edges to seal the entrenched material to be conveyed. Typically, a hexagonal shaped idler arrangement is used to maintain the tube or pipe shape of the conveyor. In many situations, both the carrying (top) and the return side (bottom) of the conveyor are formed into the pipe shape by means of idlers.

Generally, the pipe conveyor resembles the conventional belt conveyor in it's drive, belt tensioning (take-up) systems, and material transfers. These aforementioned elements are similar if not identical with those of the conventional belt conveyor's. However, on the carrying side of the conventional belt conveyors, there are usually three (3) idler rolls forcing the belt into a continuous trough by virtue of gravity. In a conventional belt conveyor, both the carrying and the return sides of the belt are supported by the same standard deck section. These deck sections include the legs and/or footings that are used to support the idlers. Thus, a typical deck section for a conventional belt will be capable of supporting the three carrying idlers and the one return idler that is typically used with conventional conveyor systems.

Pipe conveyors, on the other hand, are equipped with pipe forming and shape keeping idlers. These idlers support the belt in a generally radial manner. This radial support is typically carried out by six idler rolls supported in a generally hexagonal manner by support panels or "idler panels." Each idler panel is supported in an upright position by external structure, which is in turn supported over concrete footings or sleepers (railway ties). Idler panels, often referred to as "double panels," are typically made from a single rectangular flat plate with bent edges. The plate is divided into an upper compartment and a lower compartment, each compartment having a hole of a size which allows the tube or curled belt to pass. Some of these designs locate all six idler rolls on the same side of the panel, with each idler roll being placed in close proximity to the next idler roll, and forming the honeycomb shape discussed above. Other designs utilize somewhat longer idler rolls placed in an alternating fashion on opposite sides of the panel forming the hexagonal shape with a slight overlap of the internal adjacent corners of each idler roll.

Field experience with idler panels has revealed that there are several important, long felt, problems and limitations with the traditional idler panel design. Some of these problems include problems associated with the failure of these panels. Tubular conveyor systems are frequently use to load vessels in highly corrosive marine environments. These environments coupled with the stresses imposed on the idler panels lead to the rapid corrosion and failure of the idler panels. Repair to the panels are difficult due to the fact that, once the metal has corroded, the corroded sections must be removed and replaced with new sections of metal. Since the panels are constructed from single flat sheets the welding of reinforcement sections of metal is impractical due to warpage of the panel from the heat imposed by the welding operations. Moreover, the corrosion is likely to present itself as irregularly shaped regions, making it difficult to properly remove and replace the corroded sections. Replacement of the panels is also difficult, but this is perhaps the only practical solution. However, removal of the panels requires that the panel itself be split or that the conveyor belt be separated to allow insertion of the belt through the openings in the panels. Thus, it will be understood that any of these operations will be very time-consuming, and thus very costly in terms of production time.

From the above discussion it will be understood that the remains need for an easily serviceable idler support system for tubular conveyor systems.

It will be understood that the remains need for an idler support system, for tubular conveyor systems, which is inexpensive and which can be easily modified or tailored to suit the field conditions.

The remains a need for an inexpensive idler support system for tubular conveyors, the system being serviceable in a piecemeal fashion, eliminating the need to cut or destroy the panel for servicing the idler supports.

There remains a need for an idler support system which can be easily adjusted for allowing the user to accommodate variations in the field and accommodate various idlers and belt configurations.

There remains a need for an idler support system allows adjustment of the support to the belt, or addition of idler panel locations to adjust for additional loads created by the curvature of the belt in installations where the belt rounds a corner, for example.

There remains a need for an idler support system which allows the addition of idler panel locations after the conveyor system has been installed, without requiring the need to destroy the panel by splitting the panel or add footings or ground anchored supports.

Still further, there remains a need for an idler support system for tubular conveyors which can be tailored for including a desired number of conveyor idler supports locations or locations for idler panels on the carrier side of the belt, while reducing the number of idler support locations or idler panels on the return side of the belt.

There remains a need for an idler support panel which can be installed without the needs to modify the panel in the field, and thus eliminating the need to split the panel vertically into half panels for replacement panel application.

Thus there remains a need for a system that eliminates the need to split the panel or the belt, and thus there remains a need for an idler panel system which eliminated the need for panel splicing hardware for replacement applications.

Additionally, there remains a need for an idler support system, for tubular conveyors, which is light in weight, and thus reduces shipping and handling costs.

Still further, there remains a need for a light weight support structure for tubular conveyors; the light weight of the support system allowing a corresponding reduction in the size of the support structure needed for the assembled conveyor system.

SUMMARY

It has been discovered that the problems left unanswered by known art can be solved by providing an idler support system for use with a tubular conveyor, the system including:

1) an idler frame that includes a generally U-shaped frame component defined by a first leg and a second leg joined by a generally semicircular portion joining the first leg and the second leg, the semicircular portion being adapted for accepting at least one idler roller; and 2) a closeout section extending from the first leg to the second leg of said U-shaped frame, so that the edges of the tubular conveyor are held in the overlapping arrangement position by at least one idler roller attached to the semicircular portion.

It will be understood that to build a tubular conveyor system using the instant invention one should support the first leg and the second leg in a substantially normal orientation relative to the belt. In a preferred embodiment this is accomplished by mounting the legs over support footings or on support brackets which are in turn mounted over a support structure. The legs will be mounted over footing on installations that require replacement of existing idler frames or on installations where the instant invention is being used for building a new tubular conveyor installations.

In new installations of tubular conveyor systems, two of disclosed idler frames are mounted over a truss, footings, or other suitable foundation, in a spaced apart relationship from one another. A deck structure is then mounted between these two frames. This deck structure serves as a backbone or support for additional idler support frames. Thus, it is contemplated that at least one idler support frame may be mounted over the deck and between the two idler support frames that have been mounted over footings, and a different number of idler support frames may be mounted from the deck, extending below the deck. This arrangement allows the user to provide the necessary idler supports over the deck, on the carrying side, while providing few or no additional idler support frames below the deck on the return side. Thus, it is contemplated that a new installation may include a pair of idler support frames arranged in a spaced apart relationship to support a deck between these frames, and a third of idler frame mounted from the deck being placed between the two support idler frames that support the deck section. Additionally, it is contemplated that an additional pair of opposing closeout sections may be attached to the legs of U-shaped frame. This pair of opposing closeout sections, together with the legs of the U-shaped section, would provide the locations for support of the idlers used for the return belt, for example.

Another aspect of the preferred embodiment taught herein is that the closeout section and the U-shaped section provide locations for placement of support means, such as fasteners or welds, in a dodecagonal pattern over the closeout section and the U-shaped section. The dodecagonal pattern may be generated by placing support locations at 30 degree increments about a circle over the assembled U-shaped section and closeout section. Clearly, it is contemplated that the dodecagonal pattern may be defined over the legs and the two opposing closeout sections when these are attached across the legs of the U-shaped section.

Additionally, it will be appreciated that the idler panel or idler support frame of the present invention will preferably be fabricated from a standard structural steel profile (angle iron, WT, pipe, tubing, etc.) bent into a semi-circular shape. The fabrication of the U-shaped section from angle iron or angled metal will result in significant cost savings in materials and in assembly costs.

From the above discussion it will be understood that, due to its modular component fabrication, the instant invention provides an easily serviceable idler support system for tubular conveyor systems.

It will be understood that the disclosed idler support system eliminates the need to cut or destroy the panel for servicing the idler supports.

Also, it will be understood that the instant invention allows the user to adjust and accommodate the disclosed structure to accept variations in the field and accommodate various idlers and belt configurations.

Still further, the disclosed idler support system allows adjustment of the support to the belt by adding idler panel locations to the deck structure, and thus allows the user to adjust for local increased loading induced by turns or curves found in the tubular belt route. The disclosed invention allows the addition of idler panel locations after the conveyor system has been installed, without requiring the need to destroy the panel by splitting the panel or add footings or ground anchored supports.

Still further, the disclosed idler support system allows the use of a deck which allows the system to be tailored for including a desired number of conveyor idler support locations or locations for idler panels on the carrier side of the belt, while reducing the number of idler support locations or idler panels on the return side of the belt.

It should also be understood that while the above and other advantages and new, useful results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
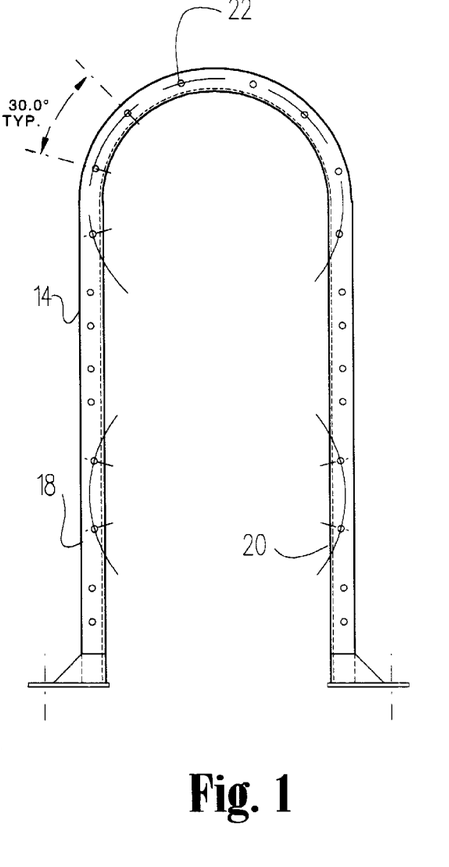
FIG. 1 is an elevational view of the invention being used as a replacement for an idler support panel on an existing installation.

Turning now to FIG. 1 where an idler support system 10 for use with a tubular conveyor has been illustrated. As is well known, the upper side of the conveyor is the carrier side, and the lower side is the return side. The system includes an idler frame 12 which has been formed from a generally U-shaped frame component 14, which has been further illustrated on FIG. 2. The U-shaped frame component includes a first leg 18 and a second leg 20 which have been joined by a generally semicircular portion 22.

Figure 3:
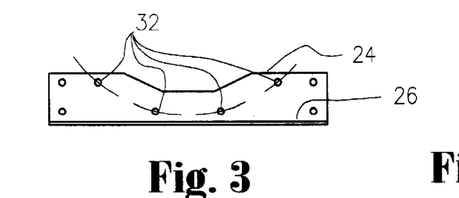
FIG. 3 illustrates a preferred embodiment of the closeout section, the closeout section including strengthened portions to making this embodiment particularly useful in support of idlers on the carrying side of the conveyor.
Figure 4:
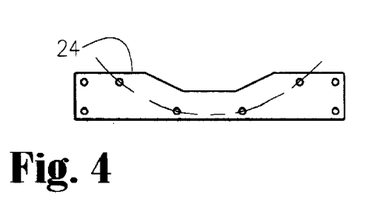
FIG. 4 illustrates another embodiment of the closeout section. The illustrated closeout being particularly useful for the support of idlers on the return side of the belt.
Figure 9:
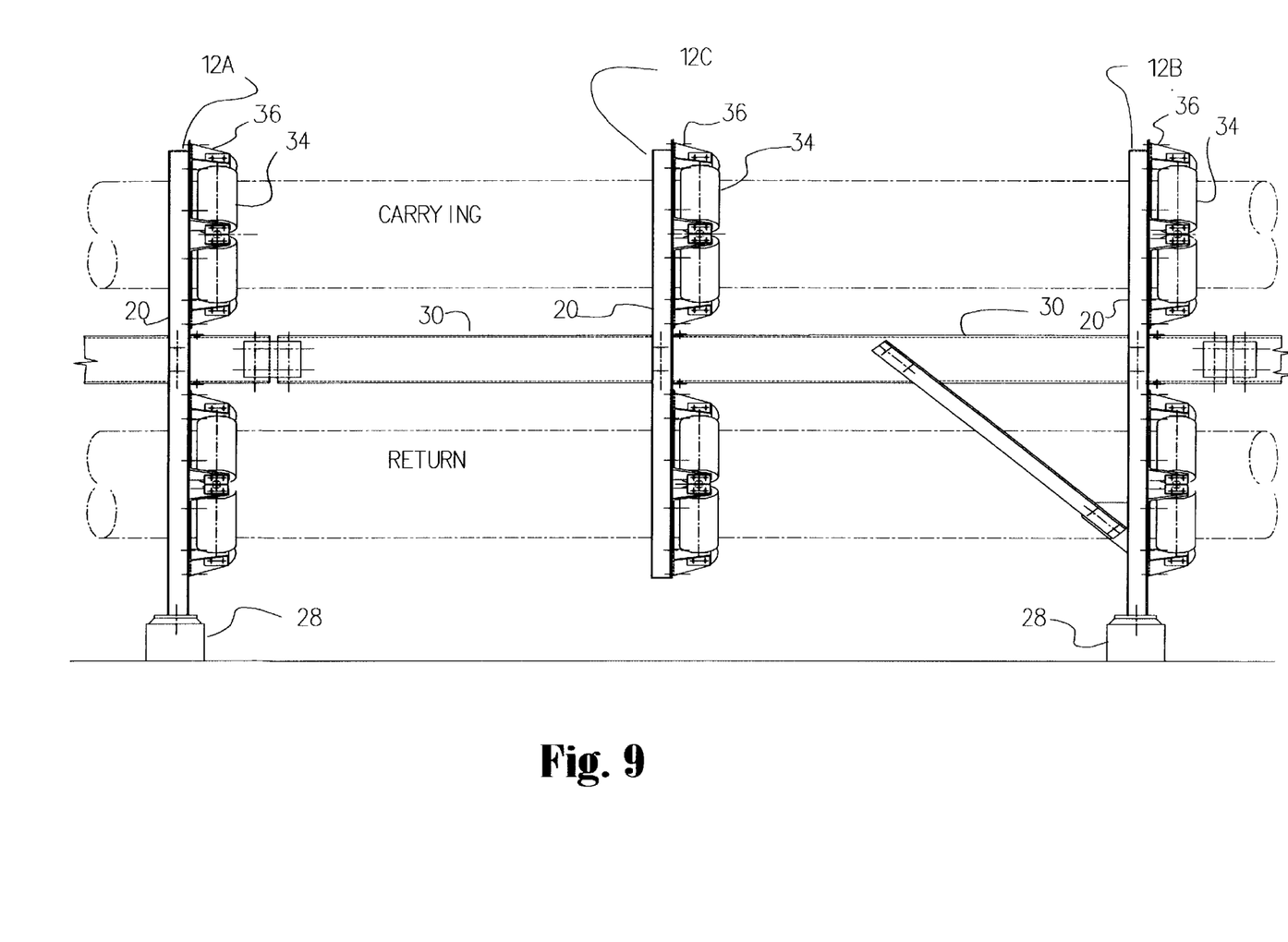
FIG. 9 is a side view illustrating the assembly of a deck section between two support idler panels.

The assembly shown on FIG. 1 includes a closeout section 24, which has been further detailed on FIG. 3 and on FIG. 4. The closeout section 24 detailed on FIG. 3 includes a strengthened portion 26, which allows the illustrated closeout section to better accept the higher loads found in the carrier side of the conveyor. The closeout section 24 illustrated on FIG. 4 does not include the strengthened section and is particularly well suited for use on the return side. It is important to note that a pair of opposing closeout sections 24 have been shown assembled on the return side. The use of the pair of opposing closeout sections 24 assembled in a generally parallel fashion to one another allow the advantageous use of the first leg 18 and the second leg 20 in the support of idlers on the return side of the belt as shown on FIG. 6 and FIG. 9.

Figure 2:
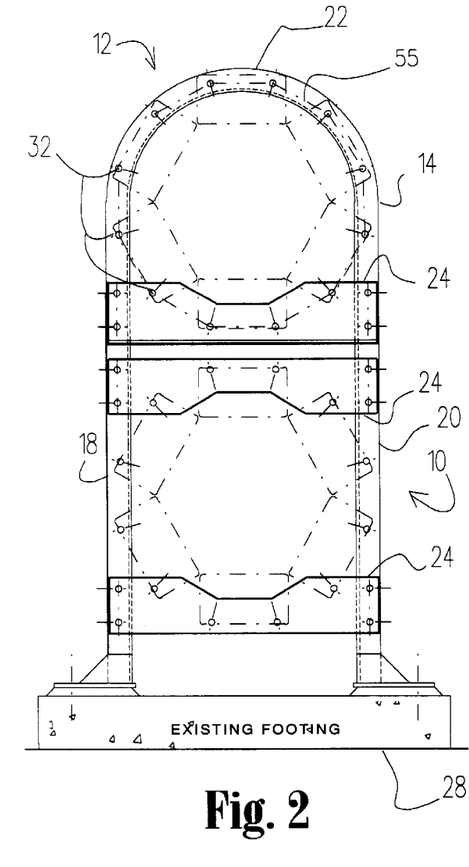
FIG. 2 illustrates an embodiment of the U-shaped section of the instant invention.

The semicircular portion 22 adapted for accepting at least one idler roller 34, shown in outline form in FIG. 2. The idler rollers are supported on idler brackets 36, and are used to allow the conveyor to retain its tubular shape. This shape is typically defined by rolling up of the edges of the tubular conveyor, and holding these edges in an overlapping arrangement by at least one idler roller attached to the semicircular portion 22 of the U-shaped section 14.

Figure 5:
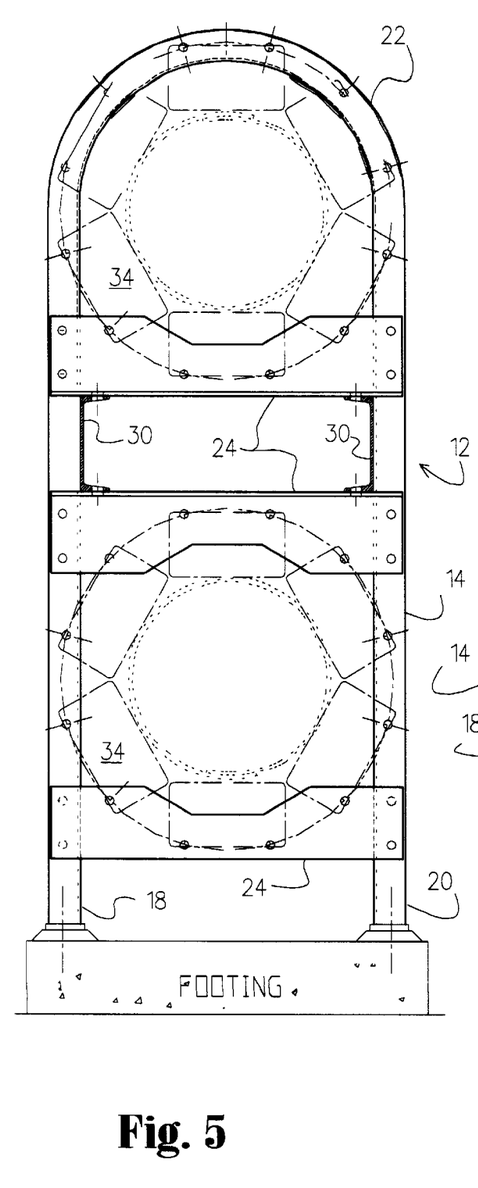
FIG. 5 illustrates the use of the instant invention in the fabrication of a new tubular conveyor. The installation serving to support the deck section.
Figure 6:
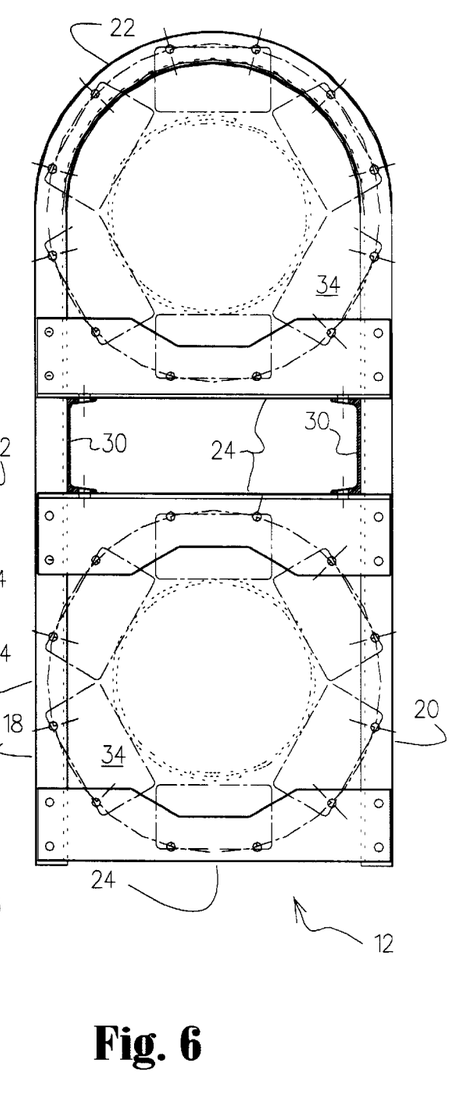
FIG. 6 illustrates the support of the instant invention from a deck section.

As can be understood from FIGS. 2, 5 and 6, it is preferred that the first leg 18 and the second leg 20 be held in a substantially normal orientation relative to the belt. This orientation may be maintained by means for supporting the first leg 18 and the second leg 20, and which may include the footing 28, illustrated in FIG. 2 and FIG. 5, or by a deck 30 section or means, as illustrated in FIG. 6. As will be discussed in greater detail hereinbelow, the deck 30 will preferably be supported from at least two idler frames 12, the frames 12 being in a spaced apart from one another as shown on FIG. 9, for example.

Figure 7:
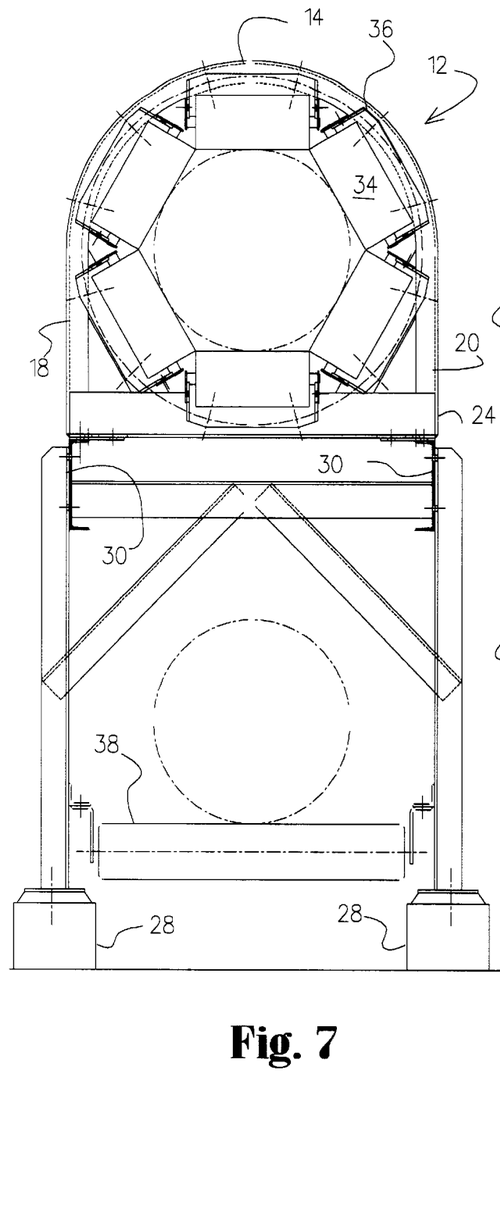
FIG. 7 illustrates an auxiliary support for a deck section, and the use of the invention on the carrier side of the belt.
Figure 8:
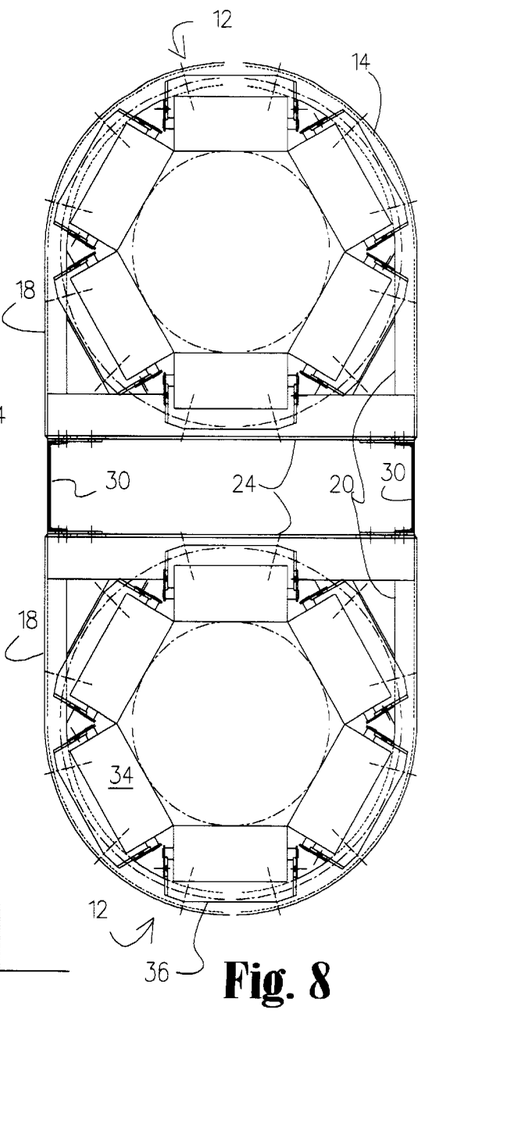
FIG. 8 illustrates the use of the invention on opposite sides of the deck.

The idler frame 12 assembly sown on FIG. 2 is particularly well suited for situations where the instant invention is being used to replace an existing idler panel. For example, in situations where an idler panel, or support frame, as shown in U.S. Pat. No. 4,809,844 to Hashimoto et al., issued May 31, 1988, and incorporated herein by reference for illustrating an example of known art idler frame fabrication, for example as shown on FIG. 2 of that U.S. Patent, needs to be replaced, the instant invention may support the shape of the existing belt, without having to separate the belt or cut and splice the panel supporting the idlers or idler rollers. Also, it is contemplated that these frames with U-shaped portions 14 with shortened legs 18 and 20 can serve as an easy and economical conversion of an existing conventional conveyor structure into a pipe conveyor system, where the regular troughing and return idlers are replaced with the disclosed idler frames with shortened legs 18 and 20 as shown on FIGS. 7, 8 and FIG. 10. FIG. 7 shows the use of an additional conventional flat return idler 38.

The instant invention is particularly advantageous in the design and fabrication of new installations of tubular conveyors, allowing conventional belt conveyor technology, or regular, existing, deck section designs to be used for pipe conveyors. For example as shown on FIGS. 9 and 10, it is contemplated that a new installation may be formed by using a first support idler frame 12A and a second support idler frame 12B, each mounted over footings 28. Between the first support idler frame 12A and the second support idler frame 12B is mounted a deck 30. On the deck 30 and between the first support idler frame 12A and the second support idler frame 12B is mounted a third idler frame 12C, with the first leg 18 and the second leg 20 of the third idler frame 12C being mounted from the deck 30. The third idler frame 12C is of a configuration as shown on FIG. 6.

Figure 10:
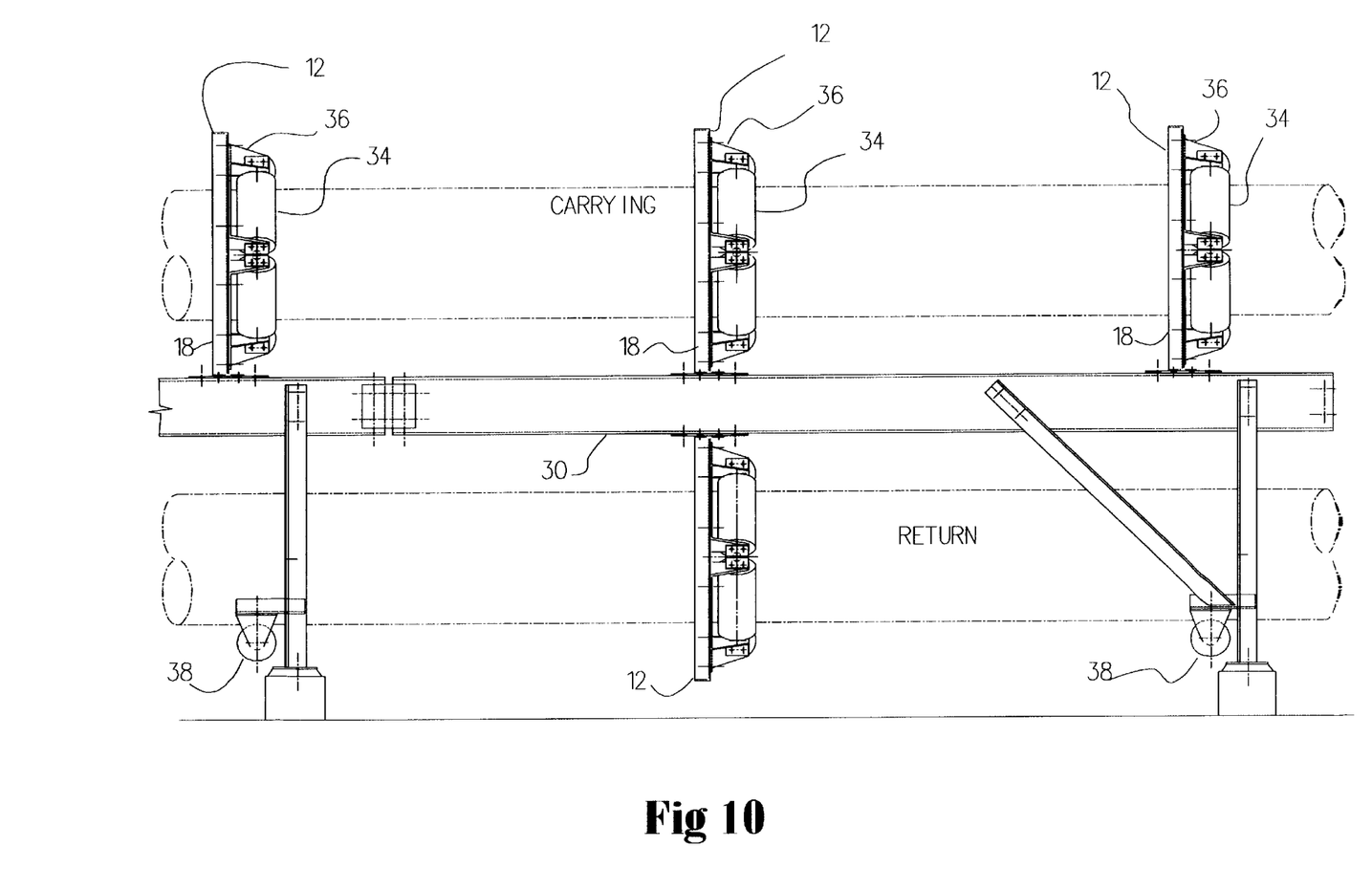
FIG. 10 illustrates the assembly of another possible configuration using the deck and additional idler panels as needed along the carrier side and the return side of the belt.

Turning now to FIG. 10 it will be understood that it is clearly contemplated that separate idler frames 12D may be attached to the deck 30 at various locations along the deck 30. Clearly, the legs of the U-shaped section of the idler frames illustrated on FIG. 10 are shorter than the legs of the assembly shown on FIG. 6. This shorter configuration is also advantageous near the terminal areas where the upper and lower compartments need to be gradually separated to allow a smooth belt run to the pulley terminals.

It is important to note that assembly of the closeout section 24 across the first leg 18 and the second leg 20 provides the location for means for accepting an idler roller support, or roller support. These means may be a simple fastener hole location 32, a stud, weld location or the like. However, it has been discovered that these means for accepting an idler roller support should be on a dodecagon pattern 55, shown on FIG. 2, over the closeout section 24 and the U-shaped section 14. The dodecagons pattern allows the formation of an idler roller support means on a honeycomb pattern, with each hole or means being at an angle of thirty degrees from the previous means for supporting an idler roller. This pattern facilitates the formation of an idler frame which allows the offset mounting of one honeycomb formation on one side of the frame versus the other side. The created dodecagon (twelve sided polygon) shape, or the desired near circular belt cross section, aids belt transition and absorbs the higher loads of belt closing at the tail terminal. Also, the single frames with shortened legs 18 and 20 can be mounted separately on walls, poles, ceilings, floors or on conventional belt conveyor galleries or trusses.

The enclosed figures illustrate that the U-shaped portion 14 of the instant invention will preferably be made from a section of angle metal. It is contemplated that some these U-shaped portions 14 may be designed and fabricated with the vertical leg at the inside of the semicircular portion, bending "the easy way", while others may be fabricated with the leg on the outside perimeter of the ached portion, bending the "hard way". The "easy way" bending process allows for tighter bending radii, recommended for conveyors of smaller pipe diameter. Extra small pipe diameters can be achieved by elongated idler brackets beyond the minimum bending radius of the subject structural member. The "hard way" bending process, on the other hand, allows an easier enclosure mounting to the frame, having a flat surface on the outside perimeter. It should be noted that the bending radius is also a function of the size and the thickness of the subject structural member.

It is contemplated that the most economical combination for new installations utilizes frames with foot brackets to support deck sections as shown on FIG. 5. The illustrated frames are of the bending the "easy way" process, and are therefore mounted on internal deck sections, with the deck 30 being mounted between the first leg 18 and the second leg 20. This configuration is especially advantageous for pipe conveyors with smaller idler frame spacing. The deck 30, bridges over two or three idler panel spacing and eliminates the need for every second or two out of three footings, respectively, as required with known idler panel installations. This method results in generating significant savings, especially on straight sections of the pipe conveyor. Moreover, this design allows for applications of both vertical and horizontal curves. For example, in a vertical curve two or three frames can be used per deck sections. In the case of three frames 12 per deck section 30, the center frame is raised or lowered depending on whether a convex or concave curve is to be generated. The disclosed frames can also be easily rotated into a radial position, eliminating the so called "cocked idler" effect. (Idler cocking is the forward tilting of conventional troughing idlers by about two degrees for belt training purposes.) This rotation eliminates additional friction resistance generation and cumulative higher belt horse power requirement.

On horizontal curves the deck member 30 may be placed a bit narrower than the idler frame itself. This allows the horizontal offset of the center idler frame to one side and the other frames to the opposite side generating the belt curve, while using only straight deck sections. Here, again, the frames 12 may be rotated into a horizontally radial position, to eliminate the "cocked idler" effect.

Figure 11:
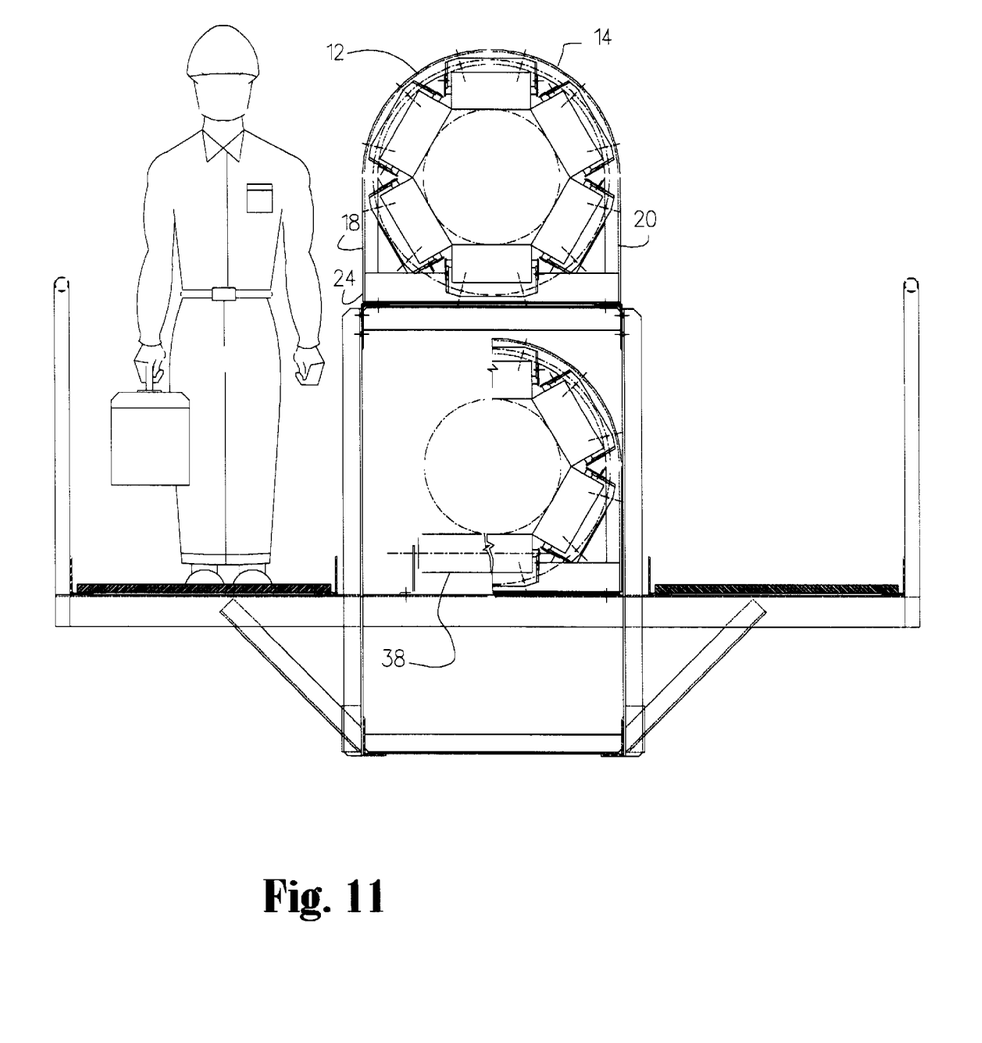
FIG. 11 illustrates the use of the invention over a truss section.

The disclosed idler frame 12 in its various forms can be utilized on trusses or inside galleries, as shown on FIG. 11. It is contemplated that the expensive curved trusses and galleries forced by the conventional pipe conveyor panel design can be eliminated by using a straight segmented type truss design facilitated by the new deck 30 and idler frame 12 combination. Until now, to enclose a conventional pipe conveyor, the rectangular idler panels were "boxed in" by corrugated sheet metal from three sides supported by additional structural members. In contrast, the disclosed idler frame 12 can be enclosed very economically by means of wire mesh or corrugated sheet metal wrapped around the legs 18 and 20 and the upper semi-circular portion 22. With this arrangement the corrugated panels become self supporting structural members due to their circular shape, with no need for additional structural reinforcement.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. An idler support system for use with a tubular conveyor, the tubular conveyor being formed from a conveyor belt having at least two edges, the belt being wrapped in a tube shape with the edges of the belt overlapping one another, the idler support system comprising:

an idler frame comprising:
a generally U-shaped frame component defined by a first leg and a second leg, the first leg and the second leg being joined by a generally arcuate portion, the arcuate portion being adapted for supporting at least one idler roller; and
a first closeout section extending from the first leg to the second leg of said U-shaped frame, so that the edges of the tubular conveyor are held in the overlapping arrangement position by at least one idler roller attached to said arcuate portion.

2. An idler support system according to claim 1 and further comprising:
means for supporting said first leg and said second leg in a substantially normal orientation relative to said belt.

3. An idler support system according to claim 2 and further comprising:
at least two of said idler frames spaced apart from one another and a deck means extending between and supported by said at least two idler frames.

4. An idler support system according to claim 3 and further comprising:
a third of said idler frame, the first leg and the second leg of said third idler frame being mounted from said deck.

5. An idler support system according to claim 1 wherein said closeout section and said U-shaped section include means for accepting an idler roller support, said means for accepting an idler roller support being on a dodecagon pattern over said closeout section and said U-shaped section.

6. An idler support system according to claim 1 and further comprising a pair of opposing closeout sections, the pair of opposing closeout sections extending from the first leg to the second leg of said U-shaped frame and being generally parallel to said first closeout section.

7. An idler support system for use with a tubular conveyor, the tubular conveyor being formed from a conveyor belt having at least two edges, the belt being wrapped in a tube shape with the edges of the belt overlapping one another, the idler support system comprising:

a generally U-shaped frame component defined by a first straight leg and a second straight leg, the first leg and the second leg being joined by a generally semicircular portion, the semicircular portion being adapted for accepting at least one idler roller; and a first closeout section extending from the first straight leg to the second straight leg of said U-shaped frame, said first closeout section and said U-shaped frame including locations for attachment of a plurality of idler supports, the locations for attachment being in a generally dodecagonal arrangement, so that the edges of the tubular conveyor are held in the overlapping arrangement by a plurality of idler rollers attached on said locations for attachment on said first closeout section and said U-shaped frame.

8. An idler support system according to claim 7 arid further comprising:

means for supporting said first leg and said second leg in a substantially normal orientation relative to said belt.

9. An idler support system according to claim 8 and further comprising:

at least two of said idler frames spaced apart from one another and a deck means extending between and supported by said at least two idler frames.

10. An idler support system according to claim 9 and further comprising:

a third of said idler frame, the first leg and the second leg of said third idler frame being mounted from said deck.

11. An idler support system according to claim 10 wherein said closeout section and said U-shaped section include means for accepting an idler roller support, said means for accepting an idler roller support being on a dodecagon pattern over said closeout section and said U-shaped section.

12. An idler support system according to claim 8 and further comprising a pair of opposing closeout sections, the pair of opposing closeout sections extending from the first leg to the second leg of said U-shaped frame and being generally parallel to said first closeout section.

13. An idler support system according to claim 12 wherein the pair of opposing closeout sections and the first leg and the second leg of said U-shaped frame include locations for attachment of a plurality of idler roller supports, the locations for attachment being in a generally dodecagonal arrangement.

14. An idler support system for use with a tubular conveyor, the tubular conveyor being formed from a conveyor belt having at least two edges, the belt being wrapped in a tube shape with the edges of the belt overlapping one another, the idler support system comprising:

a pair of idler frames comprising:

a first generally U-shaped frame component defined by a first straight leg and a second straight leg, the first leg and the second leg being joined by a generally semicircular portion, the semicircular portion being adapted for accepting at least one idler roller; and a closeout section extending from the first straight leg to the second straight leg of said U-shaped frame, so that the edges of the tubular conveyor are held in the overlapping arrangement position by at least one idler roller attached to said semicircular portion; and deck means mounted to said pair of idler frames and extending between said pair of idler frames.

15. An idler support system according to claim 14 and further comprising:

means for supporting said first leg and said second leg in a substantially normal orientation relative to the belt.

16. An idler support system according to claim 14 and further comprising:

a third of said idler frame, the first leg and the second leg of said third idler frame being mounted from said deck.

17. An idler support system according to claim 14 wherein said closeout section and said U-shaped section include means for accepting an idler roller support, said means for accepting an idler roller support being on a dodecagon pattern over said closeout section and said U-shaped section.

18. An idler support system according to claim 14 and further comprising a pair of opposing closeout sections, the pair of opposing closeout sections extending from the first leg to the second leg of said U-shaped frame and being generally parallel to said first closeout section.

* * * * *